A. D. STRONG.
CIDER PRESS.
No. 66,262.  Patented July 2, 1867.
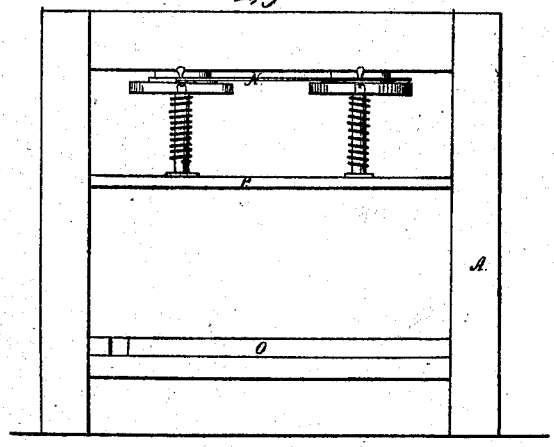
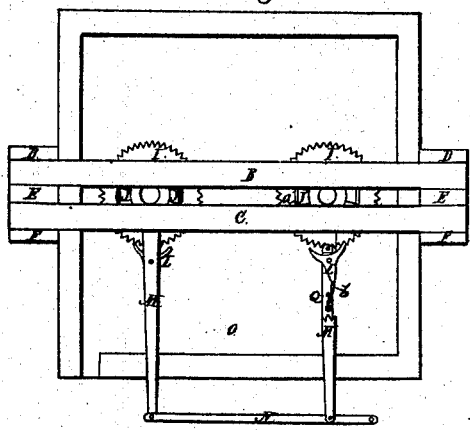
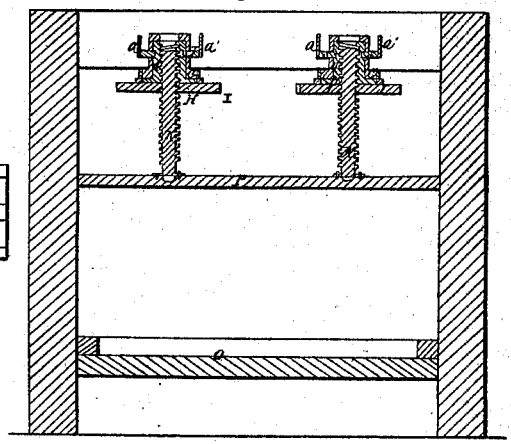

United States Patent Office.

A. D. STRONG, OF ASHTABULA, OHIO.

Letters Patent No. 66,262, dated July 2, 1867.

---

IMPROVEMENT IN CIDER-PRESSES.

---

The Schedule referred to in these Letters Patent and making part of the same.

---

TO ALL WHOM IT MAY CONCERN:

Be it known that I, A. D. STRONG, of Ashtabula, in the county of Ashtabula, and State of Ohio, have invented certain new and useful improvements in Cider-Press; and I do hereby declare that the following is a full and complete description of the same, reference being had to the accompanying drawings, making a part of this specification, in which—

Figure 1 is a side view of the press.
Figure 2, a view of the top.
Figure 3, a vertical section.
Like letters of reference refer to like parts in the several views.

This press consists of a strong wooden frame, A, fig. 1, the beam and sill of which are of two parallel pieces of timber, as shown in fig. 2, B C. The posts or sides are of three pieces, D E F, all of which are firmly bolted together, forming the rectangular space referred to. G, fig. 3, is a sleeve or bush secured in the beam, and in which the nut H is loosely fitted. Around this nut is cut a deep groove, a, in which are fitted the lugs J, which are made to pass through the sleeve into the groove, and the nut is thereby prevented from falling out of the sleeve when unsupported by the screws K. These lugs are retained in place by the transverse pieces a', fig. 3. I is a ratchet-wheel fixed to the nut, and by which it is operated by the double pawl L pivoted to the lever M. This lever is attached to the nut by a loop or ring furnished the end of the lever, and which ring loosely surrounds a boss on the upper side of the ratchet-wheel. The free ends of the levers are connected to each other by the link N, and thus they may be operated conjointly, if so desired, or singly, by disengaging the link. O is a form on which the pomace is laid up for pressing. P is the follower, by means of which the power of the screws is applied to the cheese.

By this arrangement of the several parts of the press it will be seen that in order to work the screws down upon the cheese the levers are thrown to the right. One limb of the pawl being engaged in the teeth of the wheel will cause it to turn in that direction, and thus work the nut and cause the screw to descend. On the reverse action of the lever the relation of the pawl is changed. The disengaged limb is now made to engage in the teeth, as shown in pawl L, and which is done by drawing out the pin Q from the side of the spring $b$, and inserting it on the opposite side, thus making a change in the curve of the spring, which will cause a change in the position of the pawl, thus throwing the free limb into the teeth and liberating the engaged one. By this arrangement it will be evident that the screws can be run up and down easily and rapidly without removing the levers for that purpose, as is necessary in working the old screw-press; hence much time and labor are saved in working this press.

As above observed, by connecting the levers both screws can be worked at once with the same degree of movement and certainty of action, or one only may be used, as circumstances may require. It will be found that this press can be used to great advantage for pressing various other material than the one specified, such as hay, cotton, cheese, &c., with equal convenience and success.

What I claim as my invention, and desire to secure by Letters Patent, is—

The screws K and ratchet-wheels I, supported in the cross-pieces B C of the frame A, and operated by means of the levers M, pawls L, and link N, all arranged and operating in the manner and for the purpose substantially as described.

A. D. STRONG.

Witnesses:
W. H. BURRIDGE,
FRANK ALDEN.